Aug. 3, 1965    R. H. TAYLOR    3,198,415
SOLDER FEEDING DEVICE
Filed Aug. 21, 1962    2 Sheets-Sheet 1
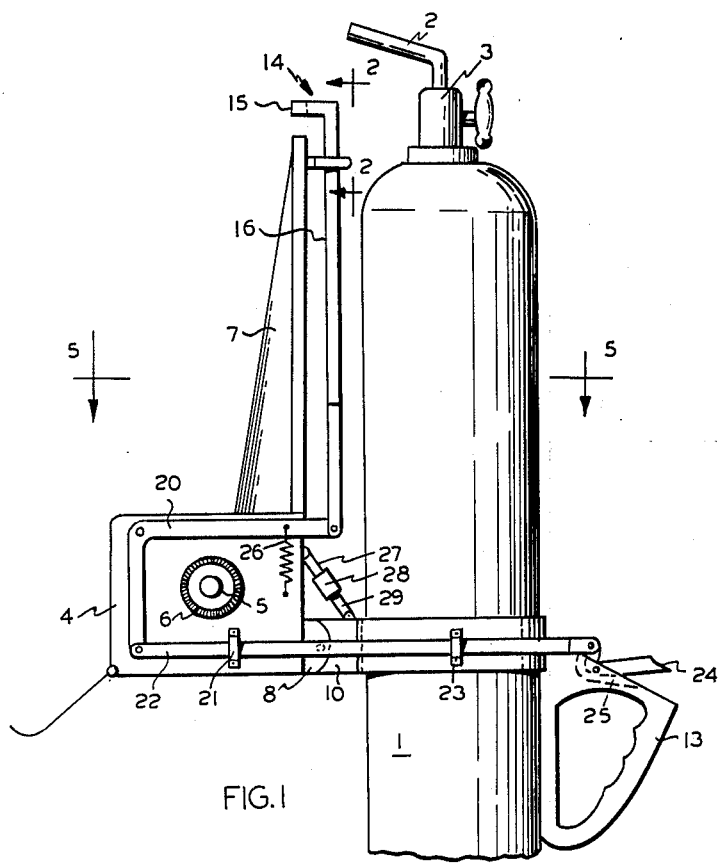
FIG.1
FIG.5
INVENTOR.
RUSSELL H. TAYLOR
BY
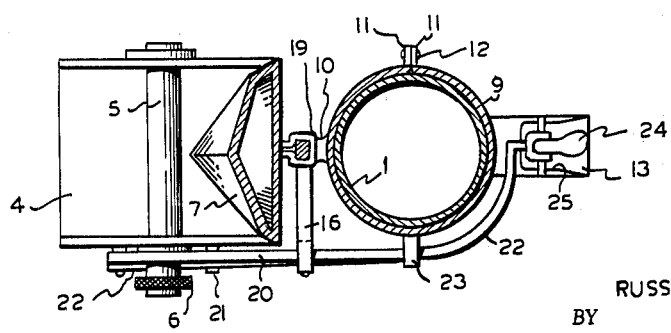
ATTORNEYS United States Patent Office 3,198,415
Patented Aug. 3, 1965

3,198,415
SOLDER FEEDING DEVICE
Russell H. Taylor, McKeesport, Pa., assignor, by mesne assignments, to Rockdale Metal Products Corporation, Wellsburg, W. Va., a corporation of West Virginia
Filed Aug. 21, 1962, Ser. No. 218,405
4 Claims. (Cl. 228—57)

This invention relates to solder feeding devices and, more particularly, relates to solder feeding devices for use on gas torches employing cylinders of compressed gases, such as propane.

The usual practice heretofore in soldering with gas torches was to ignite the torch and hold it with one hand against the work to be soldered to thereby heat the work to a soldering temperature. The solder, in the form of a strip or wire, was then applied to the heated work by holding the solder in one hand and continuing the heating by holding the cylinder of the gas torch in the other hand. This arrangement, in many cases, is quite unsatisfactory inasmuch as it leaves no hands free to hold or steady the work or to hold or steady the operator. Another disadvantage of the prior art procedures was that cylinders of compressed combustible gases are of an awkward diameter and, thus, difficult and tiring to grip over long periods of time. In many instances, the position of the operator is quite awkward, for example, the work being over his head, or behind or under other structures. In some instances, the work is inaccessible except with one hand, thereby requiring the needless removal of surrounding structures in order to provide adequate working room around the work.

It is, therefore, an object of this invention to provide a novel solder feeding device having a hand grip, which device is easily attachable to a gas cylinder of the type employing a torch and used by plumbers, steamfitters, sheetmetal workers, and the like.

A further object is the provision of a solder feeding device which readily permits operation of a soldering torch and gas cylinder with a single hand.

Another object of this invention is the provision of a solder feeding device which is not subject to clogging, jamming or other stoppage of the solder because of heat transmitted from the heat source or torch.

Another object of this invention is the provision of a solder feeding device which is rugged and durable under even the most severe treatment.

Still another object is the provision of a novel solder feeding device which is readily attachable to a gas cylinder employing a torch, which device is easily adjustable to regulate the distance of the solder being fed with relation to the flame produced by the torch.

Other objects and advantages will be readily apparent from the following description taken in conjunction with the appended drawings, in which:

FIG. 1 is a side elevation of the novel device as attached to a gas cylinder mounting a torch;

FIG. 5 is a section taken on line 5—5 of FIG. 1; and

Figure 2:
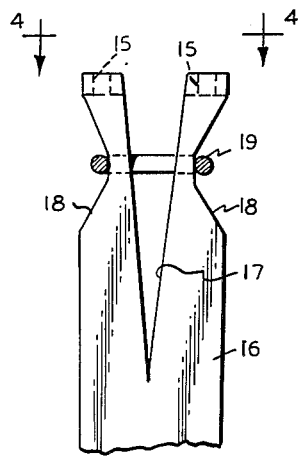
FIG. 2 is a section taken on line 2—2 of FIG. 1 illustrating the solder advancing means of the novel device in the "release" position.

Referring now to FIG. 1, there is shown a gas cylinder or bottle 1 filled with a combustible gas, such as propane, having a torch 2 mounted on said cylinder through a regulating valve 3. The novel solder feeding device comprises a container 4 having a spindle 5 rotatably mounted therein for holding a roll of a length of solder, e.g., a solder strip or wire. A knurled nut 6 is keyed at one end of the spindle 5 and is positioned outside of said container for manual movement of said spindle. A solder guide sleeve 7 is mounted on the upper side of the container 4. The guide sleeve 7 is formed with a large cross-section adjacent the container 4 and tapers as shown to a small cross-section at its free end, thus enabling the free and easy passage of the solder strip or wire from said container to the free end of said sleeve.

A circular strap 9 is pivotally mounted on one side of the container 4 below the sleeve 7 by means of a rib 10 extending from said strap to said container and hinge 8. The strap 9 is split, the ends being turned outwardly to form flanges 11 which are held together by a nut and bolt 12, thereby permitting said strap to be expanded to allow the insertion of a gas cylinder and to be contracted by tightening the nut and bolt 12 to grip said cylinder after it has been inserted. On the lateral side of the strap 9 opposite from the side to which the container 4 is attached, there is secured a hand grip 13.

Figure 3:
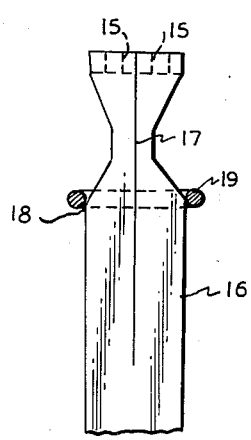
FIG. 3 is a similar view as FIG. 2 illustrating the solder advancing means in the "solder gripping" position.
Figure 6:
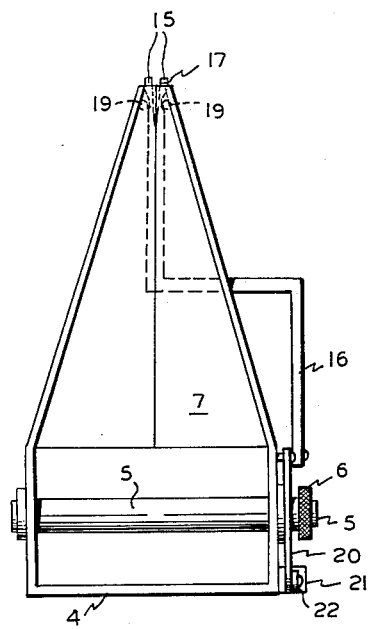
FIG. 6 is a front elevation of the novel solder feeding device.
Figure 4:
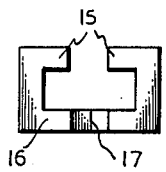
FIG. 4 is a view taken on line 4—4 of FIG. 2.

A solder advancing means 14 comprises a pair of solder gripping fingers 15 on the end of an actuating rod 16 which runs vertically along the guide sleeve 7. The rod 16 has a split 17 at its upper end and each gripping finger 15 of the pair is thus separated from the other. The rod 16 is also provided with cams 18 on the outer surface of its upper portions just below the gripping fingers 15 but within the area of the split 17. An eye 19 is mounted on the upper portions of the guide sleeve 7 and surrounds the rod 16 adjacent the cams 18. It will thus be seen that when the rod 16 is moved upwardly, the cams 18 bear against the eye 19 to cause the split 17 to be closed, thus causing the fingers 15 to approach each other, thereby gripping a strip or wire of solder disposed between said fingers. FIG. 2 illustrates the rod 16 in its "down" position wherein the split 17 is open and the fingers 15 are apart. FIG. 3 illustrates the rod 16 in its "up" position wherein the split 17 is closed and the fingers 15 are closed to each other, thereby gripping the solder strip or wire therebetween.

The upper portions of rod 16 are aligned parallel to the center line of the guide sleeve 7 and said rod extends downwardly and offsets to the side of sleeve 7 and container 4. The lower end of the rod 16 is pivotally connected to one leg of an L-shaped member 20 which is pivotally mounted on the container 4 at the juncture of the legs of said L-shaped member. The other leg of the L-shaped member 20 is pivotally connected to a trigger member 22. The trigger member 22 has one end portion rounded or bent backwardly to fit along an arc of strap 9. The straight end portion of trigger member 22 is slidably mounted on the side of container 4 by means of a staple 21, and the rounded leg of said trigger member is slidably mounted on the upper strap 9 by means of a staple 23. The free end of the rounded leg of the trigger member 22 is pivotally connected to the vertical leg of an L-shaped thumb trigger 24 pivotally mounted on the hand grip 13. At its central portion the trigger 24 is pivotally mounted in a slot 25 provided in the upper portion of the grip 13. The horizontal leg of trigger 24 is provided with a seat for receiving a thumb or other finger. In this manner, movement (depression) of the trigger 24 moves the trigger member 22 towards said trigger and such movement of the trigger member 22 is guided by the staples 21 and 23.

A spring 26 has one end mounted on the container 4 and the other end mounted on the upper leg of L-shaped member 20. In this manner, the rod 16 is biased into its lower or non-gripping position.

A sleeve adjusting upper arm 27 has one end pivotally mounted on the upper portions of container 4 and has the other end threaded for threadedly engaging turnbuckle 28. One end of a sleeve adjusting lower arm 29 is pivotally mounted on the rib 10 and the other end of said lower arm is threaded for threadedly engaging turnbuckle 28. In this manner, turning the turnbuckle 28 in one direction will cause the arms 27 and 29 to approach each other and cause the container 4 and sleeve 7 to pivot on hinge 8 towards the cylinder 1. Turning the turnbuckle 28 in the opposite direction will cause the arms 27 and 29 to further separate from each other, thereby pivoting the sleeve 7 on the hinge 8 away from the cylinder 1. In this regard, it is noted that the threaded portions of the arms 27 and 29 are threaded oppositely to each other.

In operation, a roll of solder strip or wire is mounted on the spindle 5 within the container 4. The solder strip or wire is threaded upwardly through the sleeve 7 utilizing the knurled nut 6, if necessary. The upper end of the solder wire or strip is disposed between the fingers 15. The gas torch 2 may then be lit by turning the valve 3 and igniting the gas issuing from said torch and the flame produced is regulated by means of the valve 3. The operator grasps the hand grip 13 and directs the flame of the torch towards the work. When the operator desires to advance solder into the heating zone of the flame issuing from torch 2, he merely depresses the trigger 24 with his thumb or other finger, which movement is transmitted through the trigger member 22 and L-shaped member 20 to the rod 16, thereby raising the rod. Upward movement of the rod 16 causes the eye 19 to bear against the cams 18 to cause the split 17 to close and the fingers 15 to approach each other and grip the solder wire or strip. Continued movement upwardly of the rod 16 causes the solder gripped by the fingers 15 to be advanced toward the flame. When the trigger 24 is released, the spring 26 retracts and lowers the rod 16, thereby releasing the cam surfaces 18 from the bias of eye 19, resulting in an opening of the split 17 and separation of the fingers 15 which then release solder wire or strip. The spring 26 continues to lower the rod 16 and the fingers 15 slip past the solder wire or strip until they reach their lowermost position just opposite the end of sleeve 7. It will be seen that the spring 26 also returns the trigger to its original "rest" position. Succeeding actuations of the trigger 24 bring about similar movements and advancements of the solder wire or strip.

As pointed out previously, the container 4 and guide sleeve 7 can be pivoted about the hinge 8 by turning the turnbuckle 28, thereby positioning the free end of the solder wire or strip in a desired relationship with the flame or portions of the flame issuing from the torch 2. It will also be seen that the strap 9 and its attachments can be adjusted to any point of attachment along the cylinder 1 to further position, as desired, the feeding assembly and solder with respect to the flame from torch 2.

Although the present invention has been described in connection with the embodiment shown in the drawings, this invention is not to be limited to said embodiment and is intended to be limited in no way other than as may be indicated by the appended claims.

What is claimed is:

1. A solder feeding device for a gas torch utilizing a cylinder of compressed gas, comprising a container attachable to said cylinder, releasable fastening means for removably securing said container to said cylinder, said fastening means having a hand grip portion mounted thereon, a solder guide sleeve communicating with said container and extending in spaced relation along said cylinder towards said torch and having a free end spaced from said torch, a spindle mounted in said container for supporting a length of solder in a roll, solder advancing means aligned with said guide sleeve adjacent the free end thereof, said advancing means being mounted for slidable movement towards and away from said free end and being adapted to grip said solder when moved towards said torch and release said solder when moved toward said guide sleeve, a finger-engaging member on said hand portion and connected by linkage to said solder advancing means, whereby actuation of said member actuates said solder advancing means to move same towards said torch away from said guide sleeve, and resilient means acting on said advancing means to return same towards said guide upon release of said finger-engaging member.

2. A device as claimed in claim 1 wherein the end of said guide sleeve adjacent said container is of greater cross-section than the cross-section of the free end thereof.

3. The device as claimed in claim 1 wherein said guide sleeve is hingedly mounted on said container for pivotal movement towards and away from said cylinder and adjustable retaining means for adjusting said guide sleeve to a desired position relative to said cylinder and retaining said sleeve in said position.

4. In a solder feeding device having a solder guide sleeve extending from a holder containing a source of solder in length form to a source of heat, solder advancing means for moving said solder from said source of solder to said source of heat, circular strap means fixed to said holder and adapted for encircling a cylinder of combustible gas and grasping said cylinder, and hand grip means secured to said strap means, the improvement in said solder advancing means comprising, releasable solder gripping means disposed between said guide sleeve and said source of heat and means extending from said hand grip means to said solder gripping means for moving same towards and away from said source of heat, said gripping means being adapted to grip said solder when moved towards said source of heat and to release said solder when moved away therefrom.

References Cited by the Examiner
UNITED STATES PATENTS

| | | | |
|---|---|---|---|
| 1,925,656 | 9/33 | Duitz | 113—94 XR |
| 1,951,441 | 3/34 | Rock | 113—109 |
| 2,122,194 | 6/38 | Bixby | 113—94 XR |
| 2,195,944 | 4/40 | Stream | 113—109 |
| 2,291,065 | 7/42 | Walker | 113—94 XR |
| 2,643,321 | 6/53 | Greene | 219—27 |
| 2,821,947 | 2/58 | Von Knauf | 113—94 XR |
| 2,901,585 | 8/59 | Baccari et al. | 113—109 XR |
| 3,068,826 | 12/62 | Meader et al. | 113—94 XR |

CHARLES W. LANHAM, *Primary Examiner.*

JOHN F. CAMPBELL, *Examiner.*